United States Patent [19]

Fleischmann et al.

[11] Patent Number: 5,061,762

[45] Date of Patent: Oct. 29, 1991

[54] MODIFIED POLY(ORGANO-ORGANOSILOXANES) WITH COMB OR BLOCK STRUCTURES AND A PROCESS FOR THEIR PREPARATION

[75] Inventors: Gerald Fleischmann; Herbert Eck, both of Burghausen; Johann Schuster, Emmerting, all of Fed. Rep. of Germany

[73] Assignee: Wacker-Chemie GmbH, Munich, Fed. Rep. of Germany

[21] Appl. No.: 389,132

[22] Filed: Aug. 3, 1989

[30] Foreign Application Priority Data

Aug. 25, 1988 [DE] Fed. Rep. of Germany ....... 3828862

[51] Int. Cl.$^5$ ........................................... C08F 283/12
[52] U.S. Cl. .................................... 525/478; 525/479; 525/100; 528/15; 528/26; 528/31; 528/41
[58] Field of Search ............... 525/477, 478, 479, 100; 528/41, 15, 31, 26; 556/438, 439

[56] References Cited

U.S. PATENT DOCUMENTS

| | | | |
|---|---|---|---|
| 3,692,865 | 9/1972 | Lengick | 525/479 |
| 3,694,478 | 9/1972 | Adams et al. | 525/479 |
| 3,770,791 | 11/1973 | Atkinson et al. | 556/438 |
| 3,808,248 | 4/1974 | Berger et al. | 528/41 |
| 4,504,231 | 3/1985 | Koblitz et al. | 523/116 |
| 4,771,109 | 9/1988 | Eichenauer et al. | 525/105 |
| 4,826,893 | 5/1989 | Yamazaki et al. | 523/115 |

FOREIGN PATENT DOCUMENTS 1-316388 12/1989 Japan .................................. 556/438

*Primary Examiner*—John C. Bleutge
*Assistant Examiner*—Ralph Dean

[57] ABSTRACT

The invention relates to modified poly(organo-organosiloxanes) with comb and/or block structures, which consist of a substantially linear diorganopolysiloxane base with organic polymers based on acrylates arranged in terminal positions and/or along the chain. These block polymers can be prepared by a two-step process. In a first process step, alkenyl trialkylsilylacetates are added to polyorgano-H-siloxanes in the presence of, for example, platinum catalysts and in a second process step, polar compounds, such as acrylates or methacrylates are graft copolymerized onto the polyorganosiloxanes modified with trialkylsilylacetoxyalkyl groups obtained above, in the presence of, for example, nucleophilic catalysts according to the principle of the group-transfer method. In a similar process, the polar compounds can be polymerized by the group-transfer method with alkenyl trialkylsilylacetates and the polymeric acrylic compounds modified with terminal acetoxyalkenyl groups thus obtained can be added to the polyorgano-H-siloxanes.

9 Claims, No Drawings

5,061,762

MODIFIED POLY(ORGANO-ORGANOSILOXANES) WITH COMB OR BLOCK STRUCTURES AND A PROCESS FOR THEIR PREPARATION

The invention relates to novel modified poly(organo-organosiloxanes) with comb or block structures in which the organic polymers are linked to the polysiloxane base via Si—C bonds and a process for preparing the same by polymerizing organosiloxanes and polar compounds, which have a C—C double bond in the α-position relative to a carbonyl or nitrile group.

BACKGROUND OF THE INVENTION

It is known that siloxanes can be combined with organic polymers using conventional polymerization techniques, such as radical polymerization, polycondensation or polyaddition.

Moreover, it is possible, for example, to prepare silicon-containing polymers having a comb structure, which have organopolysiloxanes as the main chain and vinyl polymers as side chains, in a manner such that in a first process step vinyl monomers, such as acrylates or methacrylates are polymerized in the presence of mercaptosilanes having dialkoxysilyl groups, with the formation of macromers (prepolymers), which are subsequently polycondensed in a second process step alone or combined with dialkoxysilanes in the presence of condensation catalysts, such as metal salts or amines (cf. EP-A2-205, 096). Here, the vinyl monomers are initially polymerized and terminally linked via an S-bridge with the dialkoxysilane radical and the difunctional silane derivatives thus formed are then polycondensed. In other words, the side chains or teeth of the comb are initially formed, which are then linked with the main chain formed by polycondensation.

In a similar manner, block copolymers having polysiloxane segments can be obtained in a first process step, for example, by polymerizing acrylic monomers in the presence of mercaptans having hydroxyl groups or carboxyl groups with the formation of prepolymers, which are then polycondensed in a second process step with bifunctional polysiloxanes in the presence of condensation catalysts (cf. EP-A2-235,728).

Moreover, graft copolymers having a block structure are known in which block copolymers are prepared in a first process step by polycondensation from polysiloxanes and organic homopolymers or copolymers in which each are bifunctional; and in a second process step, monomeric acrylic compounds are radically grafted onto the graft bases thus obtained in the presence of free radical forming initiators (cf. DE-A1-36 06 982).

Also, organosilicon block polymers are known in which polydiorganosiloxanes having terminal Si—H bonds are reacted in a first process step with selected, aliphatically unsaturated organosilyl-substituted acrylic pinacols in the presence of platinum catalysts; then, in a second process step, vinyl monomers, such as acrylate compounds, are thermally graft copolymerized onto the siloxane prepolymers thus formed, which contain bis(silyl pinacolate) radicals arranged in terminal positions or along the chain, in which the bis(silyl pinacolate) radicals function as free radical forming initiators and the graft copolymerized acrylate radicals are bonded to the siloxane graft base via Si—O bonds. These are known to be susceptible to hydrolysis (cf. DE-A1-37 07 399).

According to the prior art, monomeric vinyl compounds, which include monomeric acrylic compounds, can either be polymerized before linking with a siloxane base or can be graft copolymerized onto a siloxane base, by the radical mechanism. Since the polymers having a high molecular weight, but a very wide molecular weight distribution are obtained by radical polymerization, the resultant products also consist of mixtures of very different copolymers, in which polyorganosiloxanes having short chain polyacrylates have a silicon character and polyorganosiloxanes with long chain polyacrylates have a polyacrylate character. Therefore, comb or block structured poly(organo-organosiloxanes) having specific arrangement and relatively uniform chain length of the individual combs and blocks cannot be prepared in this manner.

Therefore, it is an object of the present invention to provide poly(organo-organosiloxanes) having comb or block structures, in which the individual combs and blocks are present in a specific arrangement with relatively uniform chain lengths and are linked to the polysiloxane base via hydrolysis-resistant bonds. Another object of the present invention is to provide processes for preparing poly(organo-organosiloxanes), in which monomeric compounds, which have a C—C double bond in the α-position relative to a carbonyl group or nitrile group, are graft copolymerized onto a siloxane base or these monomeric compounds are initially polymerized and subsequently linked to the siloxane base.

SUMMARY OF THE INVENTION

The foregoing objects and others which are apparent from the following description are accomplished in accordance with this invention, generally speaking, by providing modified poly(organo-organosiloxanes) having comb or block structures which consist of a substantially linear diorganopolysiloxane base with organic polymer units arranged in terminal positions and/or along the chain, which have been prepared by polymerizing polar compounds which have a C—C double bond in the α-position relative to a carbonyl group or a nitrile group onto a polyorganosiloxane base modified with trialkylsilylacetoxyalkyl groups or by the addition of polymeric acrylic compounds modified with terminal acetoxyalkenyl groups to a polyorgano-H-siloxane base in such a manner that the organic polymer units are in each case linked to the polysiloxane base via SiC-bonds.

These modified poly(organo-organosiloxanes) can be prepared by polymerizing polyorganosiloxanes and polar compounds in the presence of catalysts in which in a first process step (a) an alkenyl trialkylsilylacetate adds to polyorgano-H-siloxanes in the presence of metal catalysts and in a second process step (b) polar compounds which have a C—C double bond in the α-position relative to a carbonyl group or nitrile group are graft copolymerized onto the polyorganosiloxanes modified with the trialkylsilylacetoxyalkyl groups thus obtained, in the presence of nucleophilic or electrophilic catalysts. These modified poly(organo-organosiloxanes) can also be prepared by a second process, in which in the first step (c) polar compounds which have a C—C double bond in the α-position relative to a carbonyl group or nitrile group are polymerized with alkenyl trialkylsilylacetate in the presence of nucleophilic or electrophilic catalysts and the polymeric acrylic compounds modified with the terminal acetoxyalkenyl groups thus obtained, are added in a second process step (d) to polyorgano-H-siloxanes in the presence of metal catalysts.

DESCRIPTION OF THE INVENTION

The polyorgano-H-siloxanes used as starting materials in the preparation of the polyorganosiloxane base in the first process step (a) or in the second process step (d) are commercially available polydiorgano-H-siloxanes having viscosities in the range of from 10 to 1,000,000 m$^2$/s and having a total content of H atoms bonded to Si in the range of from 0.01 to 2.5 percent by weight, in which the individual H atoms may be arranged in terminal positions and/or along the chain.

Examples of organic radicals which may be present in these polydiorgano-H-siloxanes are alkyl radicals having from 1 to 18 carbon atoms, preferably from 1 to 4 carbon atoms. These organic radicals which may be the same or different, may be straight chain or branched, such as methyl, ethyl, n-propyl, isopropyl and n-butyl radicals; cycloalkyl radicals, such as cyclopentyl and cyclohexyl radicals; aryl radicals such as phenyl, tolyl, xylyl and naphthyl radicals; and aralkyl radicals such as the benzyl radical. Methyl and phenyl radicals are preferred because they are more readily available.

The alkenyl trialkylsilylacetates used are preferably those of the general formula $$R_3Si-CH_2-CO-O-(CH_2)_n-CH=CH_2$$

in which R represents alkyl radicals having from 1 to 5 carbon atoms, preferably methyl radicals and n is an integer of from 1 to 9, and more preferably n is 1.

Examples of alkenyl trialkylsilylacetates are allyl trimethylsilylacetate and 10-undecenyl trimethylsilyl acetate. Compounds of this type are novel, and they may, for example, be obtained from the corresponding alkenyl acetates and trialkylsilyl esters of trifluoromethanesulfonic acid in the presence of strong bases under anhydrous conditions.

In particular, acrylic acid derivatives of any desired type such as esters, amides and nitriles of acrylic acid and methacrylic acid may be employed as polar compounds which are graft copolymerized in the second process step (b) to the polyorganosiloxane base or are polymerized in the first process step (c). Examples of the acrylic acid derivatives are, in particular, acrylic acid esters, such as n-butyl acrylate and 2-ethylhexyl acrylate; methacrylic acid esters, such as methyl methacrylate, ethyl methacrylate, n-butyl methacrylate, cyclohexyl methacrylate, dodecyl methacrylate and tetradecyl methacrylate.

The addition reaction in the first process step (a) or in the second process step (d) can be carried out in a manner known per se in the presence of an aprotic solvent, such as toluene, at temperatures in the range of from +20° C. to +140° C., preferably +50° C. to +100° C., with the exclusion of moisture and in the presence of a metal catalyst.

Metals of Group VIII of the Periodic Table can be used as metal catalysts, which accelerate the addition of the H atoms bonded to Si in the polyorgano-H-siloxanes to the alkenyl groups in the alkenyl trialkylsilylacetates according to the first process step (a) or to the alkenyl groups in the polymeric acrylic compounds modified with acetoxy-alkenyl groups according to the second process step (d), in which the metals known, per se, are normally in the form of metals supported on substrates, as metal compounds or as complex metal compounds for addition reactions of this type. Platinum and rhodium complex compounds are particularly preferred.

The polyorganosiloxanes modified with trialkylsilylacetoxyalkyl groups prepared according to the first process step (a) preferably correspond to the general formula $$X(R')_2SiO[Si(R')_2O]_y[Si(R')(X)O]_zSi(R')_2X$$

in which R' represents alkyl radicals having from 1 to 18 carbon atoms, cycloalkyl, aryl or aralkyl radicals; X represents $(CH_2)_{n+2}OCOCH_2SiR_3$; R represents alkyl radicals having from 1 to 5 carbon atoms; n is an integer of from 1 to 9; and y and z have values in each case of from 1 to 20,000. The polymerization of the polar compounds onto the polyorganosiloxane base modified with trialkylsilylacetoxyalkyl groups prepared in the first process step (a) and is to be carried out in the second process step (b) and the polymerization of the polar compounds with alkenyl trialkylsilylacetates which is to be carried out in the first process step (c) take place according to the principle of group transfer polymerization in the presence of nucleophilic or electrophilic catalysts.

The polymeric acrylic compounds modified with terminal acetoxyalkenyl groups prepared according to the first process step (c) preferably correspond to the general formula $$CH_2=CH-(CH_2)_n-O-CO-CH_2[CH_2C(Y)(R''-)]_yH$$

in which Y represents CN, CONR'$_2$ or COOR'; R' represents alkyl radicals having 1 to 18 carbon atoms, cycloalkyl, aryl or aralkyl radicals; R'' represents H or CH$_3$; n is an integer of from 1 to 9; and y has a value of from 1 to 20,000.

In the known group transfer polymerization process, polar α-, β-unsaturated compounds are polymerized in the presence of certain initiators in combination with nucleophilic or electrophilic catalysts (cf. K. E. Piejko in "Methoden der organischen Chemie" [Methods of Organic Chemistry (Houben-Weyl) - Makromolekulare Stoffe (Macromolecular Materials) Vol. E 20 (1987), p. 153–160)].

In carrying out the process according to the invention the polyorganosiloxane bases modified with the trialkylsilylacetoxyalkyl groups prepared according to the first process step (a) act as polyfunctional polymeric initiators, whose polyfunctionality is determined by the number and arrangement of the H atoms originally present in the poly-organo-H-siloxanes, which were added to the trialkylsilyl compounds in the first process step (a) and hence, the number and arrangement of the organic polymer chain graft copolymerized onto the siloxane base in the second process step (b) are determined. In other words, block copolymers having the arrangement ABA are formed from the arrangement in the terminal position of the H atoms originally present in the poly-organo-H-siloxanes, A representing the polymeric organic blocks and B the polyorganosiloxane base, and from the arrangement along the chain of the H atoms originally present in the polyorgano-H-siloxanes comb polymers are formed, the polymeric organic chains being graft copolymerized as "teeth" onto the polyorganosiloxane base.

Correspondingly, the alkenyl trialkylsilylacetates act as monofunctional initiators for the preparation of polymeric compounds modified with terminal acetoxyalkenyl groups according to the first process step (c). The number and arrangement of these modified polymeric compounds on the polyorganosiloxane base are then determined by the number and arrangement of the H atoms present in the polyorgano-H-siloxanes, to which they are added according to the second process step (d). In this case, the polymeric acrylic compounds are initially formed and then linked to the polysiloxane base as terminal blocks or as "teeth" along the chain.

In order to carry out the polymerization reaction in the second process step (b) and in the first process step (c), the compounds having the initiator groups are reacted together with nucleophilic or electrophilic catalysts. Catalysts of this type are known for the group transfer polymerization process and described, for example, in U.S. Pat. No. 4,508,880. Tetrabutylammonium fluoride and tetrabutylammonium cyanide are particularly preferred as catalysts. The molar ratio of initiator groups, i.e., the catalyst can be in the range of from 10,000:1 to 1:1, preferably in the range of from 100 to 10:1 and more preferably in the range of from 50 to 1:1.

The polymerization process itself can be carried out at temperatures in the range of from $-80°$ C. to $+100°$ C., preferably in the range of from $+20°$ C. to $+80°$C. It is critical that the polymerization process be carried out with the exclusion of moisture, which can normally be achieved with the aid of an inert gas atmosphere such as argon or nitrogen or with dry air. The polymerization can be carried out discontinuously or continuously in the absence or in the presence of an aprotic solvent as a solution polymerization, a precipitation polymerization, a suspension polymerization or an emulsion polymerization. Here, solvents selected are advantageously those in which both the monomers used and the initiator and catalyst are sufficiently soluble at the intended reaction temperature. Examples of this type of aprotic solvent are methyl acetate, ethyl acetate, butyl acetate, acetonitrile, toluene, xylene, N,N-dimethylformamide, N-methylpyrrolidone, tetrahydrofuran, tert-butyl methyl ether and silicone fluids, which include particularly polydimethylsiloxane fluids and polymethylphenylsiloxane fluids having viscosities in the range of from about 5 to 500 mPa.s/25° C.

When carrying out the polymerization process, preferably compounds having the initiator groups and catalysts are placed in a vessel and the monomers with or without solvent are metered in. Catalysts and monomers may, however, also be added separately. Different monomers may moreover be added simultaneously or successively. The good distribution of the monomers can be assisted by mechanical agitation and it can be ensured by cooling that the intended temperature of the exothermic reaction is not exceeded. After the added monomers have been consumed, the polymerization reaction is terminated. Living polymers are, however, present in the reaction vessel which are still active even after consumption of the monomers. These can be converted into inactive polymers by the addition of chain terminating agents, such as ethanol or so-called coupling agents.

Irrespective of the process which has been used in a particular case [1(a)+2(b) or 1(c)+2(d)] the final products, namely, the poly(organo-organosiloxanes) having block or comb structure, are essentially transparent, which can be regarded as evidence of a uniform polymerization. In these final products, the arrangement and number of polymeric organic blocks and chains is determined by the H atoms originally present in the polyorgano-H-siloxanes, as described above, while on the other hand, the length of the individual blocks and chains is determined by the quantity of monomers added per initiator group, since under the conditions of group transfer polymerization normally no chain transfer occurs. These final products having an essentially uniform chain length of polar monomers graft copolymerized onto the polysiloxane base or of polymeric compounds added to the polysiloxane base, can be used in the preparation of elastomers based on diorganopolysiloxanes and as compatibility promoters for organopolysiloxanes and poly(meth)acrylates, which are normally immiscible.

In the following examples, the polymerization reactions were in each case carried out under argon as an inert gas atmosphere or in dry air, unless specified otherwise. The solvents were dried by known processes and the monomers were purified by filtration through aluminum oxide.

The preparation of the dry solution of tetrabutylammonium fluoride in tetrahydrofuran or toluene was carried out in a known manner using calcium hydride. The polymeric final products were characterized by NMR spectroscopy ($^1$HNMR) and by gas chromatography (GPC). The H-siloxanes were used directly from industrial production without additional purification.

EXAMPLE 1

Preparation of allyl trimethylsilyl acetate

A solution containing 57.8 g (260 mmol) of trimethylsilyl trifluoromethanesulfonate and 26.3 g (260 mmol) of triethylamine in 200 ml of dry diethyl ether was added dropwise with vigorous stirring and with cooling to maintain the reaction temperature of $+5°$ C., to 100 g (1 mol) of allyl acetate dissolved in 200 ml of dry diethyl ether. When the addition was complete the mixture was heated to room temperature with stirring and stirred for an additional 2 hours. The reaction mixture was subsequently washed twice with water and then with 2 percent by weight sodium hydrogen carbonate solution. The organic phase was dried over sodium sulfate and subsequently fractionated at a pressure of 2 kPa. Yield: 30.5 g (68 percent theoretical);

Boiling point $_{2kPa}$:62° C.

EXAMPLE 2:

(a) Preparation of α,ω-bis(3-trimethylsilylacetoxypropyl)polydimethylsiloxane

About 100 g of polydimethylsiloxane having in each case 1 H atom in the terminal unit, an average molecular weight of 15,000 and dissolved in 100 ml of dry toluene, were mixed with 0.345 g (2 mmol) of the allyl trimethylsilyl acetate prepared according to Example 1 and 1 mg of platinum in the form of a Pt complex compound [(acac-C$_7$H$_8$)Pt (acac), in which acac represents the acetylacetone radical; cf. DE-A-27 24 822] and the mixture heated at 80° C. for 5 hours. The solvent was then removed at 80° C. and 100 Pa and subsequently excess allyl trimethylsilyl acetate was removed at 80° C. under 0.1 Pa.

(b) Preparation of poly[dimethylsiloxane-g-(butyl acrylate-co-allyl acrylate)]

After cooling the polydimethylsiloxane modified with trimethylsilylacetoxypropyl groups prepared according to Example 2(a) above to 40° C., it was mixed with 90 g (702 mol) of n-butyl acrylate, 10 g (90 mmol) of allyl acrylate and 0.25 mmol (1 ml of a 0.25M solution in tetrahydrofuran) of tetrabutylammonium fluoride. After a few minutes an exothermic reaction commenced. After heating the mixture at 60° C. for 5 hours, a viscous, transparent block copolymer was formed. The product was purified by removing volatile impurities under a high vacuum. A quantitative yield of product was obtained.

EXAMPLE 3

Preparation of poly(dimethylsiloxane-g-methyl acrylate)

About 100 g of the polydimethylsiloxane modified with trimethylsilylacetoxypropyl groups prepared according to Example 2(a) above were dissolved in 100 g of methyl acrylate. The solution was heated to 60° C. and 1 ml of a 0.25M solution of tetrabutylammonium fluoride in tetrahydrofuran was added to it. After a few minutes a slightly exothermic reaction commenced. The reaction mixture was maintained at 60° C. for 5 hours and then the volatile components were removed under high vacuum.

About 198 g (98 percent of theoretical, based on the acrylate used) of a viscous, transparent block copolymer were obtained.

EXAMPLE 4

Preparation of poly(dimethylsiloxane-g-methyl methacrylate)

About 100 g of the polydimethylsiloxane modified with trimethylsilylacetoxypropyl groups prepared according to Example 2(a) were dissolved in 100 g (1 mol) of methyl methacrylate. The solution was heated to 60° C. and 1 ml of a 0.25M solution of tetrabutylammonium fluoride in tetrahydrofuran was added to it. Under the same reaction conditions as described in Example 3, a stable, opaque block polymer was obtained in quantitative yield.

EXAMPLE 5

(c) Preparation of polybutyl acrylate with terminal acetoxyallyl groups

About 1.25 mmol (5 ml of a 0.25M solution in tetrahydrofuran) of tetrabutylammonium fluoride were added to a solution containing 7.13 g (41.4 mmol) of allyl trimethylsilyl acetate in 500 ml of dry tert-butyl methyl ether and then 450 g (3.515 mmol) of n-butyl acrylate were subsequently metered in over one hour with cooling. At intervals of 20 minutes, 0.1 mmol (0.4 ml of a 0.25M solution in tetrahydrofuran) of tetrabutylammonium fluoride were added in each instance. When the addition of the monomer was complete, the reaction mixture was allowed to stand for 3 hours for subsequent reaction. The polymer was then precipitated by adding 500 ml of a methanol-water mixture (9:1/v:v). The solvent mixture was decanted off and the viscous polymer dried at 70° C. in vacuo.

Yield: 372.5 g (83 percent of theoretical);

Molecular weight (end group determination by NMR: 15,000.

(d) Preparation of poly(dimethylsiloxane-g-butyl acrylate)

About 200 g of the polybutyl acrylate prepared according to Example 5(c) above were dissolved in 200 ml of dry toluene and the solution heated from 90° to 95° C. After the addition of 4 mg of di-μ-chloro-bis{1,5-hexadienerhodium(I)], 100 g of a polydimethylsiloxane having 1 H atom in each of the terminal units and with an average molecular weight of 15,000 were added over 2 hours with vigorous mechanical stirring. The reaction mixture was kept at 90° to 95° C. for an additional 16 hours. The solvent was subsequently removed at 80° C. and 10 Pa.

A product which is homogeneous according to gel chromatography was obtained in quantitative yield.

EXAMPLE 6

(c) Preparation of polyhexyl methacrylate with terminal acetoxyallyl groups

Under the same conditions as described in Example 5(c) above, 510 g (3 mol) of n-hexyl methacrylate were polymerized with 4.45 g (25.8 mmol) of allyl trimethylsilyl acetate as initiator and 1.25 mmol of tetrabutylammonium fluoride as catalyst.

Yield: 486 g (95.3 percent of theoretical);

Molecular weight (end group determination by NMR) 58,000.

(d) Preparation of poly(dimethylsiloxane-g-hexyl methacrylate)

Under the same conditions as described in Example 5(d) above, 200 g of the polyhexyl methacrylate prepared according to Example 6(c) above, were reacted with 26 g of a polydimethylsiloxane having 1 atom in each of the terminal units and having an average molecular weight of 15,000. About 4 mg of di-μ-chloro-bis[1,5-hexadienerhodium(I)] were used as catalyst.

A white, elastomeric polymer, which was homogeneous according to gel chromatography was obtained in quantitative yield.

What is claimed is:

1. A modified poly(organo-organosiloxane) having comb and/or block structures which consists essentially of substantially linear polyorganosiloxanes having organic polymer units arranged in terminal positions and/or along the chain, which has been obtained by copolymerizing polar compounds having a C—C double bond in the α-position relative to a carbonyl group or a nitrile group with polyorganosiloxanes containing trialkylsilylacetoxyalkyl groups or by reacting polymeric acrylic compounds containing terminal acetoxyalkenyl groups with polyorgano-H-siloxanes in such a manner that the organic polymer units are in each case linked to the polyorganosiloxanes via Si—C bonds.

2. The modified poly(organo-organosiloxane) of claim 1, wherein the polymeric acrylic compounds containing terminal acetoxyalkenyl groups have the formula

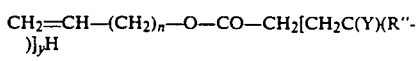

in which Y is selected from the radicals consisting of CN, CONR'$_2$ and COOR"; R' is a radical selected from the group consisting of alkyl radicals having from 1 to 18 carbon atoms, cycloalkyl, aryl and aralkyl radicals; R" is selected from the group consisting of H or CH$_3$; n is an integer of from 1 to 9; and y has a value of from 1 to 20,000.

3. A process for preparing the modified poly(organo-organosiloxane) of claim 1 by copolymerizing polyorganosiloxanes with polar compounds in the presence of catalysts which comprises in a first process step (a) reacting an alkenyl trialkylsilylacetate with polyorgano-H-siloxanes in the presence of metal catalysts, and in a second step (b) graft copolymerizing polar compounds which have a C—C double bond in the α-position relative to a carbonyl group or nitrile group with the resultant polyorganosiloxanes containing trialkylsilylacetoxy groups in the presence of nucleophilic or electrophilic catalysts.

4. The process as claimed in claim 3, wherein in the process step (a) the polydiorgano-H-siloxanes have viscosities in the range of from 10 to 1,000,000 m$^2$/s and have a total content of H atoms bonded to Si in the range of from 0.01 to 2.5 percent by weight in which the individual H atoms may be arranged in terminal positions or along the chain.

5. The process of claim 3, wherein in step (a) of the process the alkenyl trialkylsilyl acetate has the general formula $$R_3Si-CH_2-CO-O-(CH_2)_n-CH=CH_2$$

in which R represents alkyl radicals having from 1 to 5 carbon atoms and n is an integer from 1 to 9.

6. A process for preparing the modified poly(organoorganosiloxane) of claim 1 by copolymerizing polyorganosiloxanes with polar compounds in the presence of catalysts which comprises in a first process step (c) copolymerizing polar compounds which have a C—C double bond in the α-position relative to a carbonyl group or nitrile group with an alkenyl trialkylsilylacetate in the presence of nucleophilic or electrophilic catalysts and in a second step (d) reacting the resultant polymeric compounds containing terminal acetoxyalkenyl groups with polyorgano-H-siloxanes in the presence of metal catalysts.

7. The process as claimed in claim 6, wherein in the process step (d) the polydiorgano-H-siloxanes have viscosities in the range of from 10 to 1,000,000 m$^2$/s and have a total content of H atoms bonded to Si in the range of from 0.01 to 2.5 percent by weight in which the individual H atoms may be arranged in terminal positions or along the chain.

8. The process of claim 6, wherein in step (c) of the process the alkenyl trialkylsilyl acetate has the general formula $$R_3Si-CH_2-CO-O-(CH_2)_n-CH=CH_2$$

in which R represents alkyl radicals having from 1 to 5 carbon atoms and n is an integer from 1 to 9.

9. A polyorganosiloxane modified with trialkylsilylacetoxyalkyl groups of the general formula $$X(R')_2SiO[Si(R')_2O]_y[Si(R')(X)O]_zSi(R')_2X$$

in which R' is a radical selected from the group consisting of alkyl radicals having from 1 to 18 carbon atoms, cycloalkyl, aryl and aralkyl radicals; X represents $(CH_2)_{n+2}OCOCH_2SiR_3$; R represents alkyl radicals having from 1 to 5 carbon atoms; n is an integer of from 1 to 9; and y and z each have values of from 1 to 20,000.

* * * * *